(12) United States Patent
Fukasawa et al.

(10) Patent No.: US 12,046,991 B2
(45) Date of Patent: Jul. 23, 2024

(54) MULTIPLEX POWER CONVERSION SYSTEM HAVING MEANS TO PREVENT FAILURE SPREAD

(71) Applicant: TMEIC Corporation, Chuo-ku (JP)

(72) Inventors: Issei Fukasawa, Tokyo (JP); Masahiro Kinoshita, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 345 days.

(21) Appl. No.: 17/416,901

(22) PCT Filed: Jul. 23, 2019

(86) PCT No.: PCT/JP2019/028870
§ 371 (c)(1),
(2) Date: Jun. 21, 2021

(87) PCT Pub. No.: WO2021/014573
PCT Pub. Date: Jan. 28, 2021

(65) Prior Publication Data
US 2022/0069698 A1 Mar. 3, 2022

(51) Int. Cl.
*H02M 1/32* (2007.01)
*H02M 1/00* (2007.01)
(Continued)

(52) U.S. Cl.
CPC .......... *H02M 1/32* (2013.01); *H02M 1/0009* (2021.05); *H02M 7/487* (2013.01); *H02M 7/493* (2013.01); *H02M 7/537* (2013.01); *H02M 7/4833* (2021.05)

(58) Field of Classification Search
CPC .......... H02M 1/32; H02M 1/325; H02M 7/48; H02M 7/483; H02M 7/487; H02M 7/49;
(Continued)

(56) References Cited

U.S. PATENT DOCUMENTS

| | | | |
|---|---|---|---|
| 2011/0199707 A1* | 8/2011 | Kazemi | H02H 7/20 361/47 |
| 2013/0208516 A1* | 8/2013 | Kusunoki | H02P 29/02 363/37 |

(Continued)

FOREIGN PATENT DOCUMENTS

| | | |
|---|---|---|
| CN | 101098108 A | 1/2008 |
| CN | 103427474 A | 12/2013 |

(Continued)

OTHER PUBLICATIONS

International Preliminary Report on Patentability and Written Opinion issued Feb. 3, 2022 in PCT/JP2019/028870, 7 pages.
(Continued)

*Primary Examiner* — Gustavo A Rosario-Benitez
(74) *Attorney, Agent, or Firm* — Oblon, McClelland, Maier & Neustadt, L.L.P.

(57) ABSTRACT

A multiplex power conversion system enabling preventing a failure from spreading, with a simple configuration. The multiplex power conversion system includes a plurality of unit power converters. In the plurality of unit power converters, respective direct-current positive sides are connected. Respective direct-current negative sides are connected. Respective direct-current neutral points are not short-circuited. For example, the respective direct-current neutral points are not connected. Therefore, a failure in a power converter can be prevented from spreading.

5 Claims, 9 Drawing Sheets

(51) Int. Cl.
    *H02M 7/483*     (2007.01)
    *H02M 7/487*     (2007.01)
    *H02M 7/493*     (2007.01)
    *H02M 7/537*     (2006.01)

(58) Field of Classification Search
    CPC ...... H02M 7/493; H02M 7/537; H02H 7/122; H02H 7/1222; H02H 7/1225; H02H 7/1227; H02H 3/08; H02H 3/087; H02H 3/32; H02H 3/332
    See application file for complete search history.

(56) References Cited

U.S. PATENT DOCUMENTS

| | | | | |
|---|---|---|---|---|
| 2013/0272039 | A1* | 10/2013 | Saniter | G01R 31/52 363/55 |
| 2015/0103573 | A1* | 4/2015 | Zhu | H02M 5/4585 363/131 |
| 2016/0365807 | A1 | 12/2016 | Inoue et al. | |
| 2019/0372504 | A1* | 12/2019 | Satou | H02P 29/024 |

FOREIGN PATENT DOCUMENTS

| | | |
|---|---|---|
| EP | 1 109 306 B1 | 3/2008 |
| JP | 11-46481 A | 2/1999 |
| JP | 2003-70263 A | 3/2003 |
| JP | 2008-11606 A | 1/2008 |
| JP | 2012-100401 A | 5/2012 |
| KR | 10-1093288 B1 | 12/2011 |

OTHER PUBLICATIONS

Extended European Search Report issued on Jan. 9, 2023 in European Patent Application No. 19939003.0, 10 pages.
International Search Report issued on Oct. 8, 2019 in PCT/JP2019/028870 filed on Jul. 23, 2019, 2 pages.
Indian Office Action issued Mar. 7, 2022 in Indian Patent Application No. 202117027728, 5 pages.
International Preliminary Report on Patentability and Written Opinion issued Feb. 3, 2022 in PCT/JP2019/028870 (with English translation only), 8 pages.
Office Action dated Feb. 1, 2024 in corresponding CN patent application No. 201980085559.X, and an English translation.
Office Action issued Jan. 22, 2024 in corresponding European Patent Application No. 19939003.0.

* cited by examiner

MULTIPLEX POWER CONVERSION SYSTEM HAVING MEANS TO PREVENT FAILURE SPREAD

FIELD

The present invention relates to a multiplex power conversion system.

BACKGROUND

Patent Literature 1 discloses a multiplex power conversion system including a plurality of three-level power converters. According to the multiplex power conversion system, prevention of an increase in temperature of direct-current smoothing capacitors and stability in potential of direct-current buses can be ensured.

CITATION LIST

Patent Literature

[PTL 1] JP H11-046481 A

SUMMARY

Technical Problem

In the multiplex power conversion system described in Patent Literature 1, respective direct-current neutral points in the unit power converters are short-circuited via a bus. In this case, if a short-circuit failure occurs between the direct-current positive side and the direct-current neutral point or between the direct-current negative side and the direct-current neutral point in a certain unit power converter, a short-circuit current flows between the plurality of unit power converters through the bus. Therefore, the failure may spread to the other normal unit power converters.

The present invention has been made in order to solve the aforementioned problem. An object of the present invention is to provide a multiplex power conversion system enabling preventing a failure from spreading, with a simple configuration.

Solution to Problem

A multiplex power conversion system according to the present invention includes a plurality of unit power converters, respective direct-current positive sides of the plurality of unit power converters being connected, respective direct-current negative sides of the plurality of unit power converters being connected, respective direct-current neutral points of the plurality of unit power converters being not short-circuited.

Advantageous Effects of Invention

According to the present invention, in a plurality of unit power converters, respective direct-current neutral points are not short-circuited. In this case, no short-circuit current flows between the respective direct-current neutral points. Therefore, a failure can be prevented from spreading, with a simple configuration.

DESCRIPTION OF EMBODIMENTS

Embodiments of the present invention will be described with reference to the accompanying drawings. Note that in the drawings, parts that are identical or correspond to each other are provided with a same reference numeral. Overlapping descriptions of such parts will arbitrarily be simplified or omitted.

Embodiment 1

Figure 1:
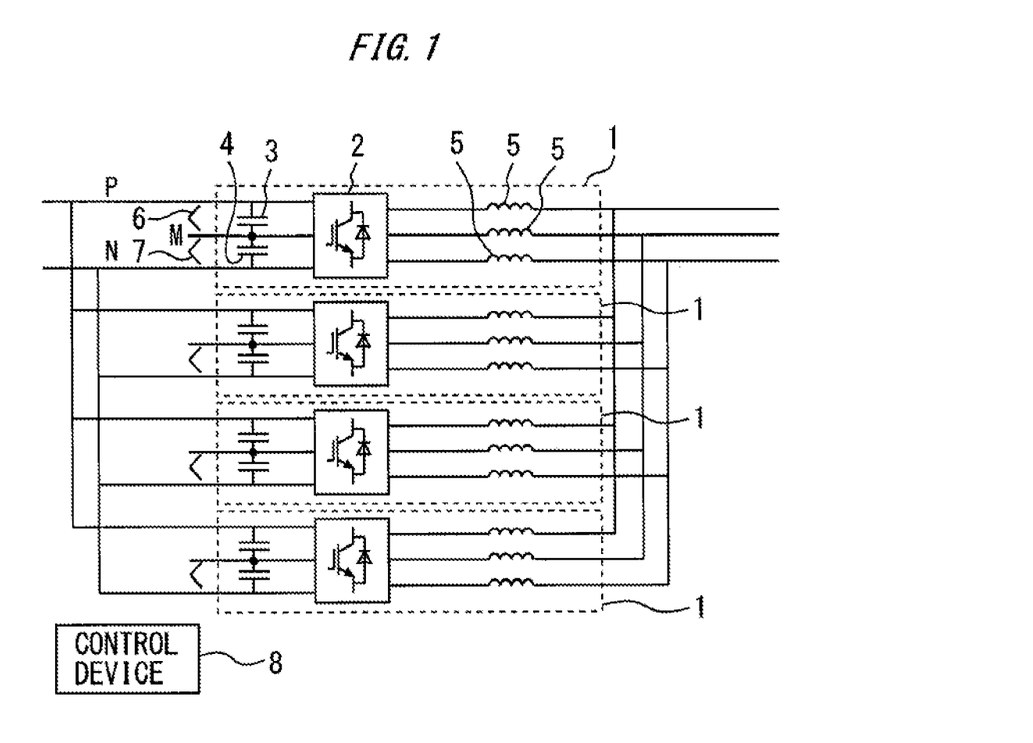
FIG. 1 is a configuration diagram of a multiplex power conversion system according to Embodiment 1.

FIG. 1 is a configuration diagram of a multiplex power conversion system according to Embodiment 1.

As illustrated in FIG. 1, the multiplex power conversion system includes a plurality of unit power converters 1. For example, in each of the plurality of unit power converters 1, the direct-current side is connected to a non-illustrated direct-current power supply. For example, in each of the plurality of unit power converters 1, the non-illustrated alternate-current side is connected to a load.

Each of the plurality of unit power converters 1 includes a switching element group 2, a positive-side capacitor 3, a negative-side capacitor 4 and a plurality of reactors 5.

The switching element group 2 includes a plurality of non-illustrated switching elements.

The positive-side capacitor 3 is connected between a direct-current positive side P and a direct-current neutral point M of the unit power converter 1. The negative-side capacitor 4 is connected between a direct-current negative side N and the direct-current neutral point M of the unit power converter 1.

The reactors 5 are connected in series to respective phases of the alternate-current side.

In the plurality of unit power converters 1, the respective direct-current positive sides P are connected to one another. The respective direct-current negative sides N are connected to one another. The respective direct-current neutral points M are not short-circuited to one another. For example, the respective direct-current neutral points M are not connected to one another.

For example, a positive-side voltage sensor 6 is provided in any one unit power converter 1 of the plurality of unit power converters 1. The positive-side voltage sensor 6 is provided so as to be capable of detecting a potential difference between the direct-current positive side P and the direct-current neutral point M in the relevant unit power converter 1.

A plurality of negative-side voltage sensors 7 are respectively provided in the plurality of unit power converters 1. The plurality of negative-side voltage sensors 7 are respectively provided so as to be capable of detecting a potential difference between the direct-current negative side N and the direct-current neutral point M in the plurality of unit power converters 1.

For example, a control device 8 transmits a same gate signal to each of the plurality of unit power converters 1. For example, the control device 8 transmits gate signals including a same voltage instruction value and different carrier waves to the respective unit power converters 1.

The control device 8 calculates an amount of inequality of the potential difference between the direct-current positive side P and the direct-current neutral point M for each of the plurality of unit power converters 1, based on results of detection by the positive-side voltage sensor 6 and the plurality of negative-side voltage sensors 7. The control device 8 calculates an amount of inequality of the potential difference between the direct-current negative side N and the direct-current neutral point M for each of the plurality of unit power converters 1, based on results of detection by the plurality of negative-side voltage sensors 7.

For example, the control device 8 detects an amount of inequality of potential difference between the direct-current negative side N and the direct-current neutral point M for each of n unit power converters included in the multiplex power conversion system. More specifically, for example, on the assumption that Vi is a potential difference between the direct-current negative side N and the direct-current neutral point M of an i-th unit power converter of the n unit power converters, the control device 8 calculates an amount of inequality of a potential difference between the direct-current negative side N and the direct-current neutral point M for each of the unit power converters, according to Expression (1) below.

[Math. 1]

$$\Delta v_i = v_i - \frac{1}{n}\sum_{k=1}^{n} v_k \quad (1)$$

The control device 8 makes the switching element groups 2 of the plurality of unit power converters 1 based on results of the calculation of the amounts of inequality.

Next, a first example of a unit power converter 1 will be described with reference to FIG. 2.

Figure 2:
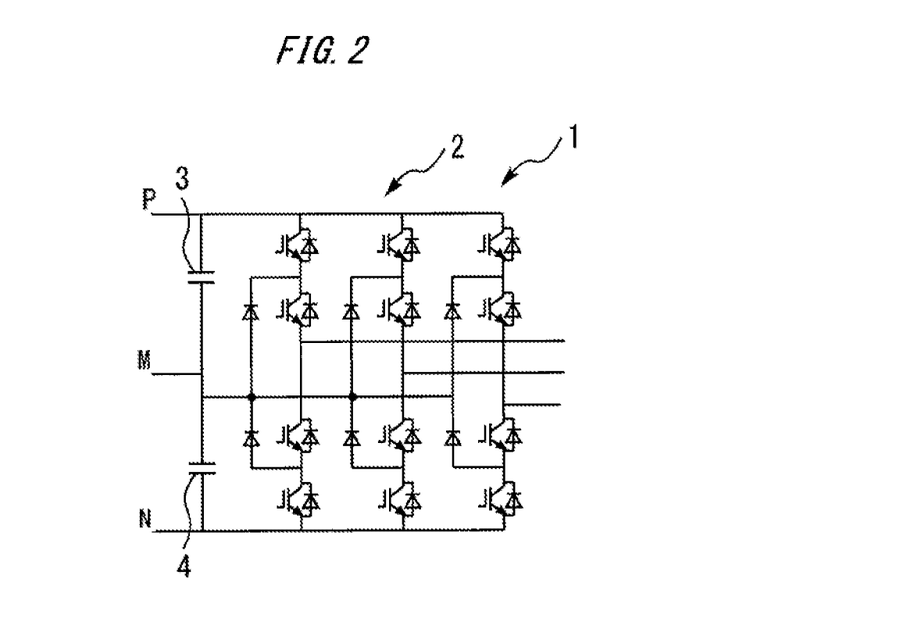
FIG. 2 is a configuration diagram of a first example of a unit power converter in the multiplex power conversion system according to Embodiment 1.

FIG. 2 is a configuration diagram of a first example of a unit power converter in the multiplex power conversion system according to Embodiment 1.

FIG. 2 is an example configuration of a three-phase, three-level power converter using self-excited semiconductor devices and diodes. In the unit power converter 1, two direct-current capacitors are connected in series between direct-current terminals and a direct-current neutral point, which is an intermediate point between the two direct-current capacitors, is provided. Upon on or off signals being provided to gates of the respective self-excited semiconductor devices in the unit power converter, a potential of any of the direct-current positive side P, the direct-current neutral point M and the direct-current negative side N is output to an alternate-current terminal of each phase in response to the signals.

Next, a second example of a unit power converter 1 will be described with reference to FIG. 3.

Figure 3:
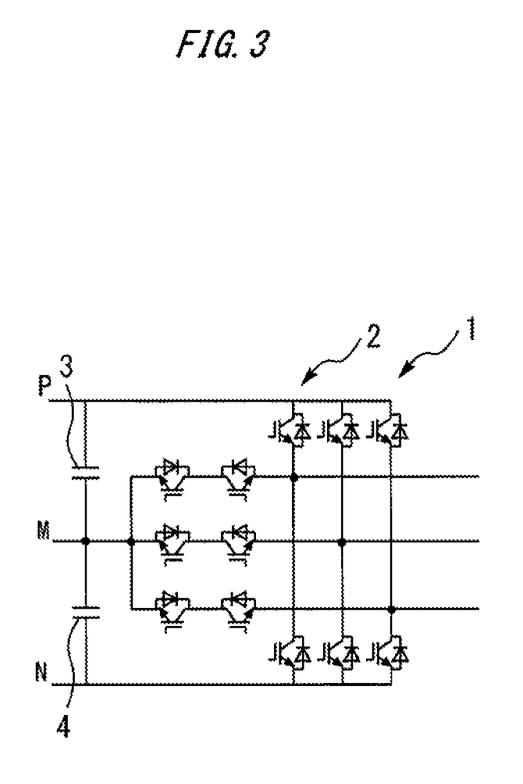
FIG. 3 is a configuration diagram of a second example of a unit power converter in the multiplex power conversion system according to Embodiment 1.

FIG. 3 is a configuration diagram of a second example of a unit power converter in the multiplex power conversion system according to Embodiment 1.

FIG. 3 is an example configuration of a three-phase, three-level power converter using self-excited semiconductor devices and diodes. In the unit power converter 1, also, as in the power converter illustrated in FIG. 2, upon on or off signals being provided to gates of the respective self-excited semiconductor devices in the unit power converter, a potential of any of the direct-current positive side P, the direct-current neutral point M and the direct-current negative side N is output to an alternate-current terminal of each phase in response to these signals.

In Embodiment 1, for example, a difference between a voltage $V_{PM}$ and a voltage $V_{MN}$ in each of the unit power converters is a potential of the relevant direct-current neutral point M. Where the voltage $V_{PM}$ and the voltage $V_{MN}$ are equal to each other, the potential of the direct-current neutral point M is zero. If the voltage $V_{PM}$ and the voltage $V_{MN}$ are not equal to each other, an excessive voltage is applied to the direct-current capacitor on one of the direct-current positive side P and the direct-current negative side N or the switching elements, and thus, normally, the potential of the direct-current neutral point M is controlled so as to be close to zero, or an absolute value of the potential of the direct-current neutral point M is compared with a threshold value, and if the absolute value exceeds the threshold value, operation for protecting the power converter is performed to prevent application of excessive voltage.

Here, two examples of a three-phase, three-level power converter are indicated; however, the configuration is not limited to these two examples. Also, here, the examples of three-phase power converters are indicated as mere examples, and the number of phases is not limited to three phases and the above is applicable in a similar manner irrespective of the number of phases. Also, here, the examples of three-level power converters are indicated as mere examples and the number of levels is not limited to three and the above is applicable also to a power converter having a number of levels that is larger than three in a similar manner.

Next, an overview of operation of the control device 8 will be described with reference to FIG. 4.

Figure 4:
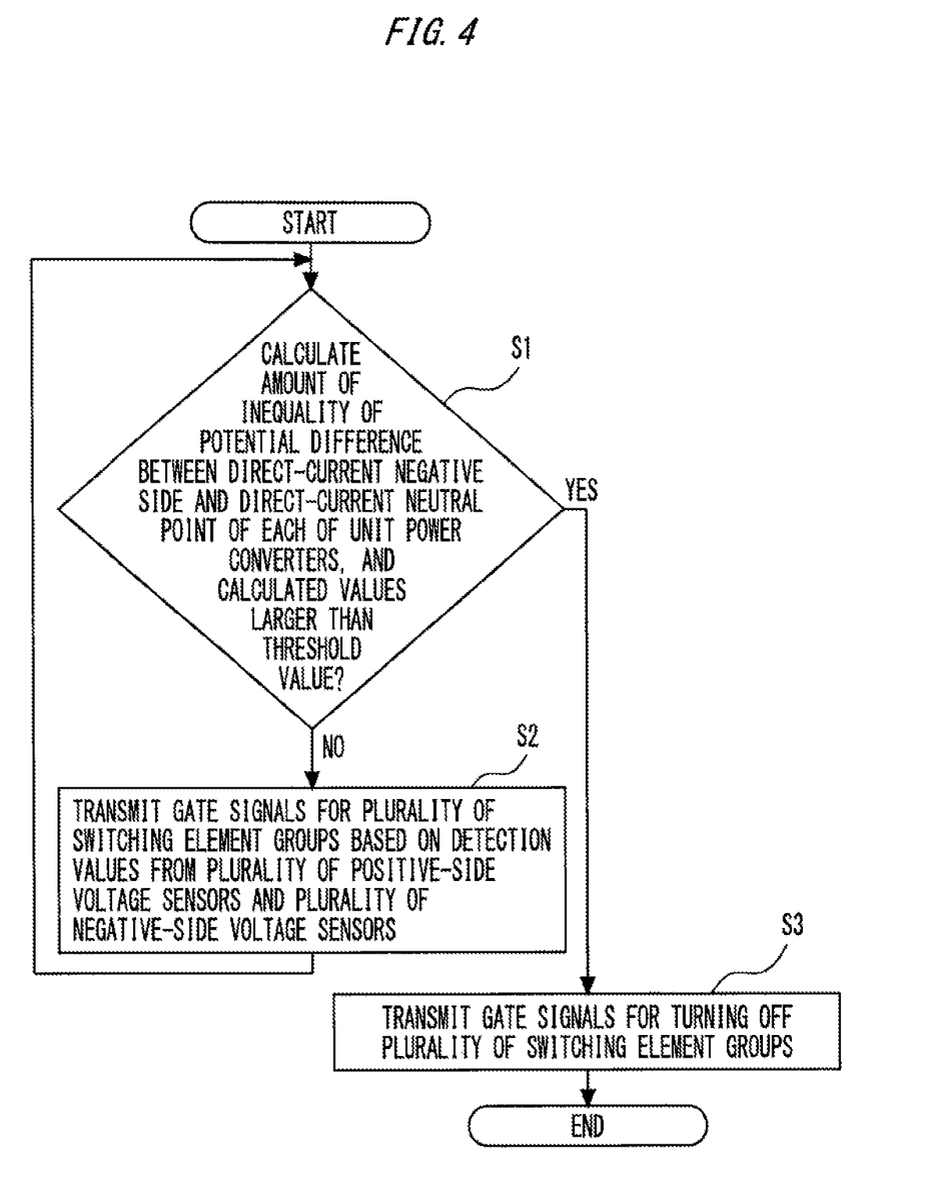
FIG. 4 is a flowchart for describing an overview of operation of a control device in the multiplex power conversion system according to Embodiment 1.

FIG. 4 is a flowchart for describing an overview of operation of a control device in the multiplex power conversion system according to Embodiment 1.

In step S1, the control device 8 calculates an amount of inequality of the potential difference between the direct-current negative side N and the direct-current neutral point M of each of the unit power converters and determines whether or not the calculated values are larger than a preset threshold value.

If the amount of inequality of the potential difference between the direct-current negative side N and the direct-current neutral point M of each of the unit power converters is not larger than the preset threshold value in step S1, the control device 8 performs operation in step S2. In step S2, the control device 8 transmits gate signals to the plurality of switching element groups 2 based on respective detection values from a plurality of positive-side voltage sensors 6 and the plurality of negative-side voltage sensors 7. Subsequently, the control device 8 performs the operation in step S1.

If the amount of inequality of the potential difference between the direct-current negative side N and the direct-current neutral point M of each of the unit power converters is larger than the preset threshold value in step S1, the control device 8 performs operation in step S3. In step S3, the control device 8 transmits gate signals for turning off the plurality of switching element groups 2. Subsequently, the control device 8 ends the operation.

According to Embodiment 1 described above, in the plurality of unit power converters 1, the respective direct-current neutral points M are not short-circuited. In this case, direct-current capacitors are included in a current loop extending through the alternate-current sides and the direct-current sides of the plurality of unit power converters 1 in a period in which each unit power converter 1 outputs the potential of the direct-current neutral point M to an alternate-current terminal. Where the respective direct-current neutral points M are short-circuited via a bus, the direct-current capacitors are bypassed by the bus in the loop, and thus, the direct-current capacitors are not included in the current loop. Therefore, the respective direct-current neutral points M being not short-circuited makes an impedance against a circulating current large in comparison with the case where the respective direct-current neutral points M are short-circuited. Therefore, the circulating current is reduced. As a result, in selection of an electric component, an amount of superimposition that should be taken into account in circulating current is reduced and ratings of the electric component are thus lowered, enabling reduction in cost of the multiplex power conversion system.

Also, even if a short-circuit failure occurs between the direct-current positive side P and the direct-current neutral point M in a certain unit power converter 1, no short-circuit current flows among the respective direct-current neutral points M in the unit power converters 1. Therefore, there is no need for fuses to be inserted for preventing a short-circuit failure of a unit power converter 1 from spreading to a failure of the other unit power converters 1 where the respective direct-current neutral points M are connected. As a result, the costs can be reduced by the amount of the fuses.

Next, an example of the control device 8 will be described with reference to FIG. 5.

Figure 5:
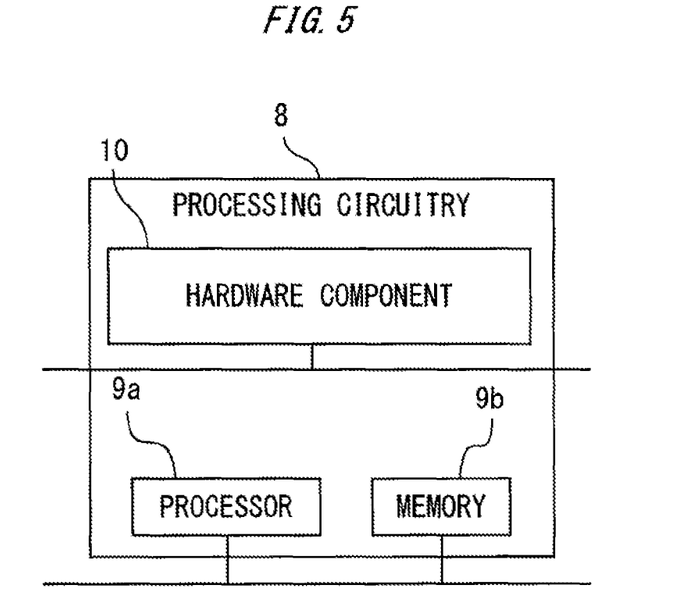
FIG. 5 is a hardware configuration diagram of the control device in the multiplex power conversion system according to Embodiment 1.

FIG. 5 is a hardware configuration diagram of a control device in the multiplex power conversion system according to Embodiment 1.

Each of functions of the control device 8 can be implemented by processing circuitry. For example, the processing circuitry includes at least one processor 9a and at least one memory 9b. For example, the processing circuitry includes at least one special purpose hardware component 10.

Where the processing circuitry includes at least one processor 9a and at least one memory 9b, each of the functions of the control device 8 is implemented by software, firmware or a combination of software and firmware. At least one of the software and the firmware is described in the form of programs. At least one of the software and the firmware is stored in the at least one memory 9b. The at least one processor 9a implements respective functions of the control device 8 by reading and executing the programs stored in the at least one memory 9b. The at least one processor 9a is also referred to as a central processing unit, a processing device, an arithmetic device, a microprocessor, a microcomputer or a DSP. For example, the at least one memory 9b is a non-volatile or volatile semiconductor memory such as a RAM, a ROM, a flash memory, an EPROM or an EEPROM, a magnetic disk, a flexible disk, an optical disk, a compact disc, a mini-disk or a DVD.

Where the processing circuitry includes the at least one special purpose hardware component 10, the processing circuitry is implemented by, for example, a single circuit, a complex circuit, a programmed processor, a parallel-programmed processor, an ASIC, an FPGA or any of combinations thereof. For example, the functions of the control device 8 are implemented by respective processing circuits. For example, the functions of the control device 8 are collectively implemented by the processing circuitry.

Some of the functions of the control device 8 may be implemented by the special purpose hardware component 10 and others of the functions may be implemented by the software or the firmware. For example, a function that transmits gate signals may be implemented by the processing circuitry serving as the special purpose hardware component 10 and the functions other than the function that transmits gate signals may be implemented by the at least one processor 9a reading and executing programs stored in the at least one memory 9b.

As described above, the processing circuitry implements each of the functions of the control device 8 by means of the hardware component 10, the software, the firmware or any of combinations thereof.

Embodiment 2

Figure 6:
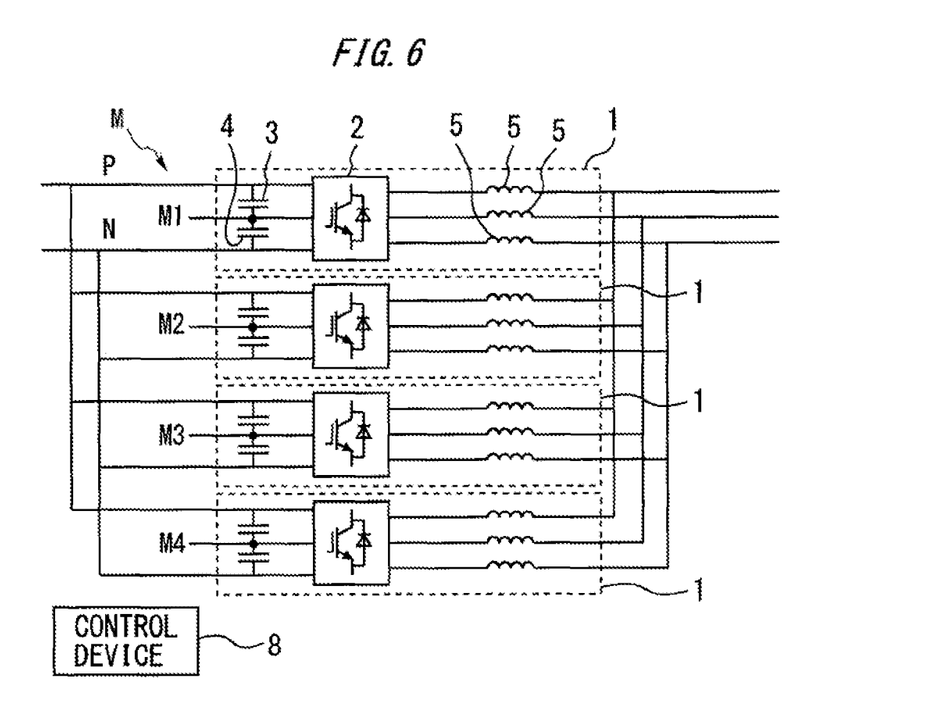
FIG. 6 is a configuration diagram of a multiplex power conversion system according to Embodiment 2.
Figure 7:
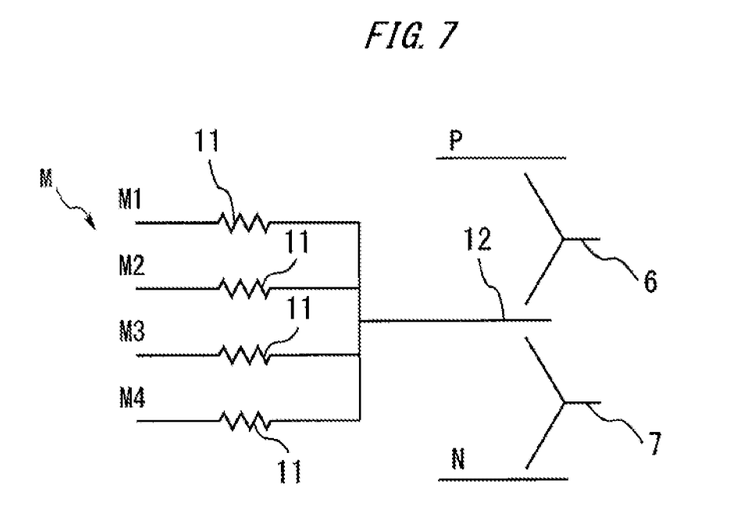
FIG. 7 is a configuration diagram of a major part of the multiplex power conversion system according to Embodiment 2.

FIG. 6 is a configuration diagram of a multiplex power conversion system according to Embodiment 2. FIG. 7 is a configuration diagram of a major part of the multiplex power conversion system according to Embodiment 2. Note that parts that are identical or correspond to parts in Embodiment 1 are provided with reference numerals that are the same as those of the parts in Embodiment 1. Descriptions of such parts will be omitted.

As illustrated in FIG. 6, in the multiplex power conversion system according to Embodiment 2, as in the multiplex power conversion system according to Embodiment 1, respective direct-current neutral points M (represented as M1, M2, M3, and M4) are not short-circuited.

However, as illustrated in FIG. 7, the multiplex power conversion system according to Embodiment 2 includes a voltage dividing circuit. The voltage dividing circuit includes a plurality of unit resistances 11 and a potential detection point 12.

Respective one ends of the plurality of unit resistances 11 are respectively connected to a plurality of direct-current neutral points M (represented as M1, M2, M3, and M4), and respective one ends of the plurality of unit resistances 11, the one ends being not connected to the direct-current neutral points M, are connected to one another. Ratings of each of the plurality of unit resistances 11 include a resistance value and a rating that prevent fire damage in case of short-circuiting on the direct-current side of the relevant unit power converter 1. Upon short-circuiting on the direct-current side of the unit power converter 1, energy flows into the unit resistances 11 from the direct-current side or the alternate-current side of an inverter or a direct-current capacitor. The energy is limited by protection via a fuse or a breaker on the direct-current side and the alternate-current side or electrostatic energy of the direct-current capacitor. Therefore, the unit resistances 11 are selected so as to prevent fire damage within a range of possible inflow energy.

A voltage applied as a result of the short-circuiting on the direct-current side is either a voltage between the direct-current negative side N and the direct-current neutral point M or a voltage between the direct-current positive side and the direct-current neutral point M.

The potential detection point 12 is connected in series to the plurality of unit resistances 11.

A positive-side voltage sensor 6 detects respective potential differences between direct-current positive sides P and potential detection points 12 of the plurality of unit power converters 1.

A negative-side voltage sensor 7 detects respective potential differences between direct-current negative sides N and potential detection points 12 of the plurality of unit power converters 1.

According to Embodiment 2 described above, the potential differences between the direct-current positive sides P and the potential detection points 12 and the potential differences between the direct-current negative sides N and the potential detection points 12 are detected by two voltage sensors. At this time, if resistance values of the plurality of unit resistances 11 are the same, in the positive-side voltage sensor 6, an average value of voltages $V_{PM}$ between the direct-current positive sides P and the direct-current neutral points M in the plurality of unit power converters 1 can be detected, and in the negative-side voltage sensor 7, an average value of voltages $V_{MN}$ between the direct-current neutral points M and the direct-current negative sides N of the plurality of unit power converters 1 can be detected. Therefore, an average value of potentials of the direct-current neutral points M in the respective unit power converters 1 can be detected. Therefore, the case where an average value of potentials of direct-current neutral points M is detected enables reduction in number of voltage sensors.

Note that the resistance values of the unit resistances 11 do not necessarily need to be the same. If the resistance values are not equal to one another, in the potential detection point 12, a weighted average value according to the respective resistance values appears, and thus, the weighted average value can be detected.

Embodiment 3

Figure 8:
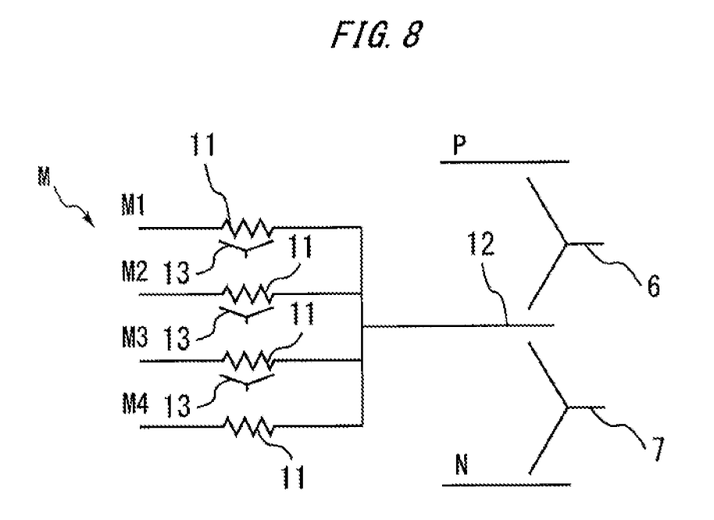
FIG. 8 is a configuration diagram of a major part of a multiplex power conversion system according to Embodiment 3.

FIG. 8 is a configuration diagram of a major part of a multiplex power conversion system according to Embodiment 3. Note that parts that are identical or correspond to parts in Embodiment 2 are provided with reference numerals that are the same as those of the parts in Embodiment 2. Descriptions of such parts will be omitted.

As illustrated in FIG. 8, the multiplex power conversion system according to Embodiment 3 includes a plurality of unit voltage sensors 13. The number of unit voltage sensors 13 is smaller than the number of unit power converters 1 by one.

In FIG. 8, a top unit voltage sensor 13 detects a voltage $V_{M1M}$ applied to a top unit resistance 11. A second unit voltage sensor 13 from the top detects a voltage $V_{M2M}$ applied to a second unit resistance 11 from the top. A third unit voltage sensor 13 from the top detects a voltage $V_{M3M}$ applied to a third unit resistance 11 from the top.

A control device 8 recognizes the voltage $V_{M1M}$ applied to the top unit resistance 11 based on a detection value from the top unit voltage sensor 13. The control device 8 recognizes the voltage $V_{M2M}$ applied to the second unit resistance 11 from the top based on a detection value from the second unit voltage sensor 13 from the top. The control device 8 recognizes the voltage $V_{M3M}$ applied to the third unit resistance 11 from the top based on a detection value from the third unit voltage sensor 13.

The control device 8 recognizes a voltage $V_{M4M}$ applied to the bottom resistance according to Expression (2) below.

[Math. 2]

$$V_{M4M} = -V_{M1M} - V_{M2M} - V_{M3M} \tag{2}$$

Note that although in the present embodiment, the number of unit voltage sensors 13 is smaller than the number of unit power converters by one and a voltage between opposite ends of the unit resistance 11 not to be subjected to detection by a unit voltage sensor 13 is recognized according to Expression 2, the number of unit voltage sensors 13 may be the same as the number of unit power converters and voltages between respective opposite ends of the unit resistances 11 may be all detected by the unit voltage sensors 13.

According to Embodiment 3 described above, respective amounts of inequality of the voltages applied to the plurality of unit resistance 11 can be recognized and respective amounts of inequality of potentials of direct-current neutral points M (represented as M1, M2, M3, and M4) in the respective unit power converters 1 can be recognized. Therefore, an inequality of the potentials of the direct-current neutral points M, the inequality being caused by a failure of a unit power converter 1, can be detected and the unit power converter 1 having the failure can be identified. As a result, the failure is detected and operation of protecting unit power converters 1 is performed, enabling preventing the failure to spreading to the other normal parts.

For example, as the protection operation, an off signal may be provided to gates of all of switching elements in a switching element group included in at least one unit power converter to stop switching. Also, for example, where there are three or more unit power converters 1, a switch may be provided on at least one of the direct-current positive side and the direct-current negative side and a switch for a failed unit power converter may be disconnected.

Note that where the potentials of the direct-current neutral points M in the plurality of unit power converters 1 are detected without using the unit resistances 11, for example, sensors that detects respective voltages between the direct-current neutral points M and the direct-current negative sides N in the respective unit power converters 1 are provided; however, in comparison with such case, the voltages applied to the unit voltage sensors 13 are normally small. Therefore, unit voltage sensors 13 having low ratings can be used. Where a failure of a unit power converter 1 occurs, for example, where a short-circuit occurs between the direct-current positive side P and the direct-current neutral point M, a voltage that is excessively large relative to the ratings of the unit voltage sensors 13 is likely to be applied; however, the excessively large voltage can be prevented from being applied to the unit voltage sensors 13, by providing a voltage limiting resistance in series between the unit voltage sensors 13 and a detection point and providing voltage limiting elements, for example, Zener diodes or varistors in parallel with the unit voltage sensor 13.

Also, there is a method in which a unit current sensor that detects a current flowing in a unit resistance 11 is used for detecting a voltage applied to the unit resistance 11. In this case, the unit current sensor may have low ratings.

Embodiment 4

Figure 9:
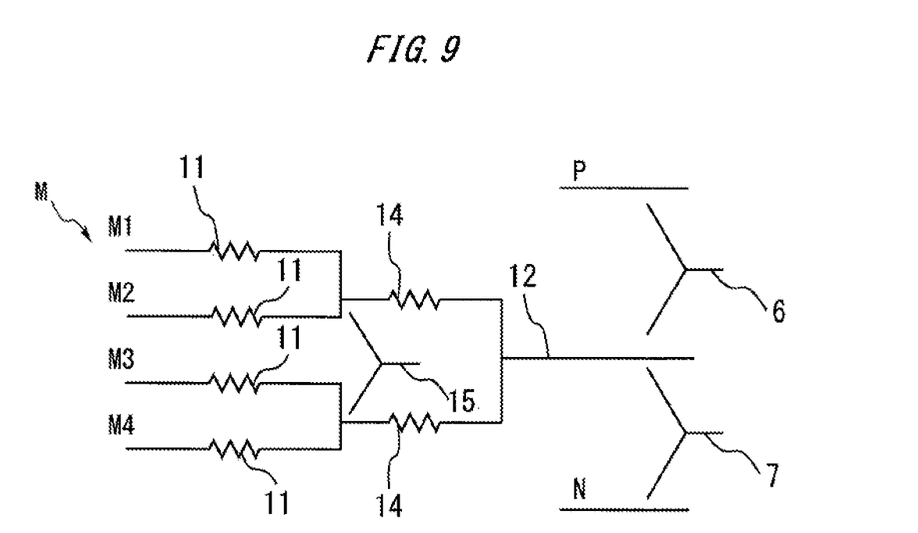
FIG. 9 is a configuration diagram of a major part of a multiplex power conversion system according to Embodiment 4.

FIG. 9 is a configuration diagram of a major part of a multiplex power conversion system according to Embodiment 4. Note that parts that are identical or correspond to parts in Embodiment 2 are provided with reference numerals that are the same as those of the parts in Embodiment 2. Descriptions of such parts will be omitted.

As illustrated in FIG. 9, a plurality of unit resistances 11 are divided in a plurality of resistance groups. In each of the plurality of resistance groups, a plurality of unit resistances 11 are connected in parallel to each other.

A plurality of integrated resistances 14 are respectively provided for the plurality of resistance groups. The integrated resistances 14 are connected in series to the respective resistance groups. The plurality of integrated resistances 14 are connected in series to a potential detection point 12.

An integrated voltage sensor 15 detects a voltage generated because of an inequality of a potential of a direct-current neutral point M of a unit power converter 1. If potentials of direct-current neutral points M (represented as M1, M2, M3, and M4) in all of unit power converters 1 are equal to one another, no voltage is applied to any of the unit resistances 11 and the integrated resistances 14 illustrated in FIG. 9, a voltage detected in the integrated voltage sensor 15 is zero. If an inequality occurs in the potential of the direct-current neutral point M in one of the plurality of unit power converters 1, a current flows in the unit resistances 11, 15 because of a potential difference occurring due to the inequality. At this time, a voltage that is not zero occurs between opposite ends of the integrated voltage sensor 15 and the voltage can be detected.

According to Embodiment 4 described above, the integrated voltage sensor 15 detects a voltage generated because of an inequality of the potential of the direct-current neutral point M in a unit power converter 1. Therefore, the inequality of the potential of the direct-current neutral point M caused by a failure of the unit power converter 1 can be detected. As a result, the failure spreading to the other normal parts can be prevented by detecting the failure and performing operation of protecting the unit power converters 1. Although the unit power converter 1 having the failure cannot be identified, the number of voltage sensors can be reduced.

Embodiment 5

Figure 10:
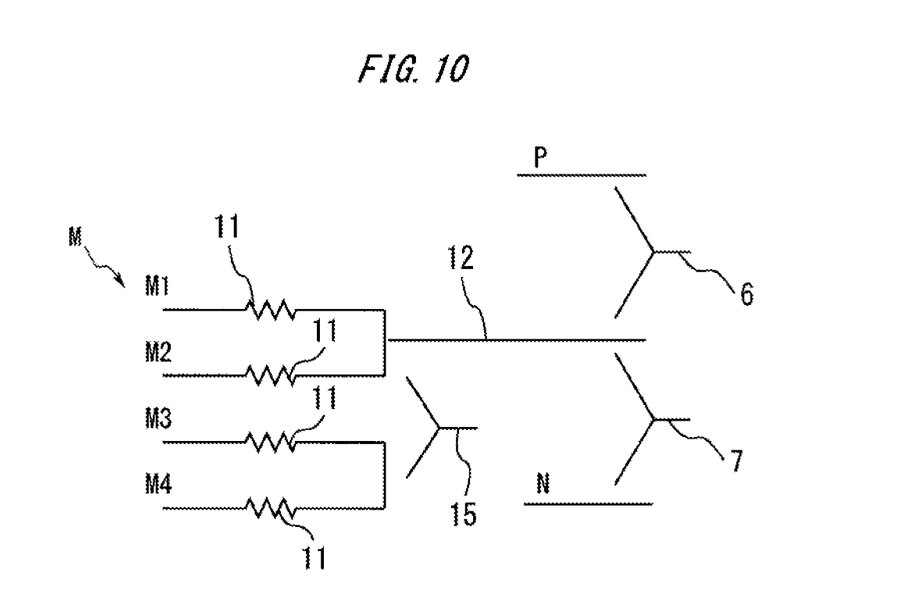
FIG. 10 is a configuration diagram of a major part of a multiplex power conversion system according to Embodiment 5.

FIG. 10 is a configuration diagram of a major part of a multiplex power conversion system according to Embodiment 5. Note that parts that are identical or correspond to parts in Embodiment 4 are provided with reference numerals that are the same as those of the parts in Embodiment 4. Descriptions of such parts will be omitted.

As illustrated in FIG. 10, one of a plurality of resistance groups is connected to a potential detection point 12 with no integrated resistance 14 interposed therebetween. One of the plurality of resistance groups is not connected to the potential detection point 12.

According to Embodiment 5 described above, a failure of a unit power converter 1 can be detected with no need for an integrated resistance 14.

Embodiment 6

Figure 11:
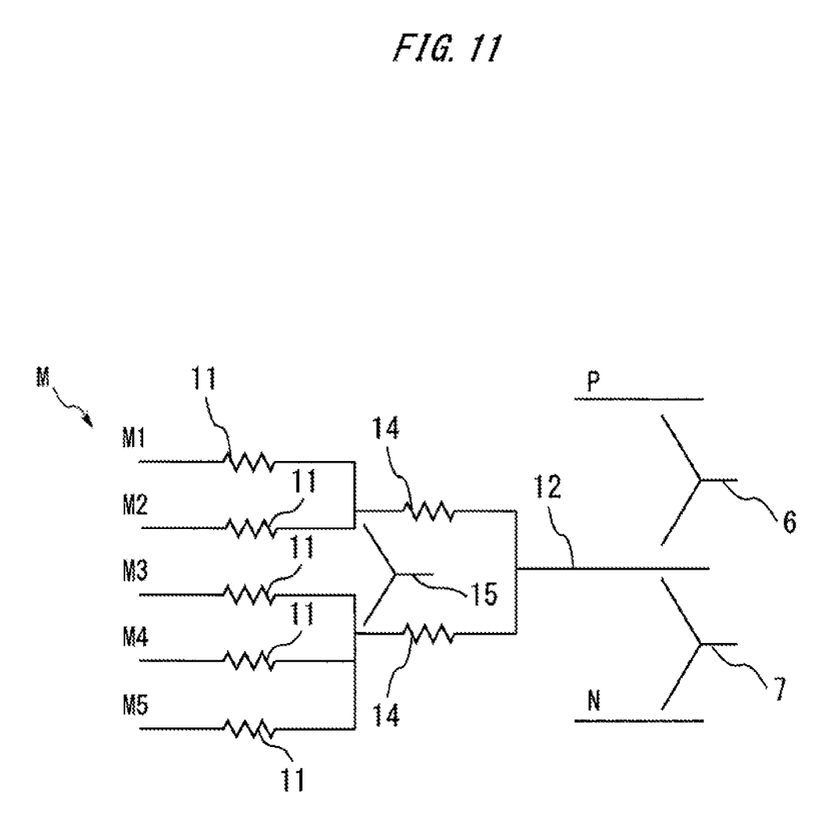
FIG. 11 is a configuration diagram of a major part of a multiplex power conversion system according to Embodiment 6.

FIG. 11 is a configuration diagram of a major part of a multiplex power conversion system according to Embodiment 6. Note that parts that are identical or correspond to parts in Embodiment 4 are provided with reference numerals that are the same as those of the parts in Embodiment 4. Descriptions of such parts will be omitted.

FIG. 11 indicates a case where five unit power converters 1 are provided. In this case, the number of unit resistances 11 is five. Direct-current neutral points M are represented as M1, M2, M3, M4, and M5.

In this case, one of a plurality of resistance groups includes two unit resistances 11. The other of the plurality of resistance groups includes remaining three unit resistances 11.

According to Embodiment 6 described above, as in Embodiment 4, a failure of a unit power converter 1 can be detected.

Embodiment 7

Figure 12:
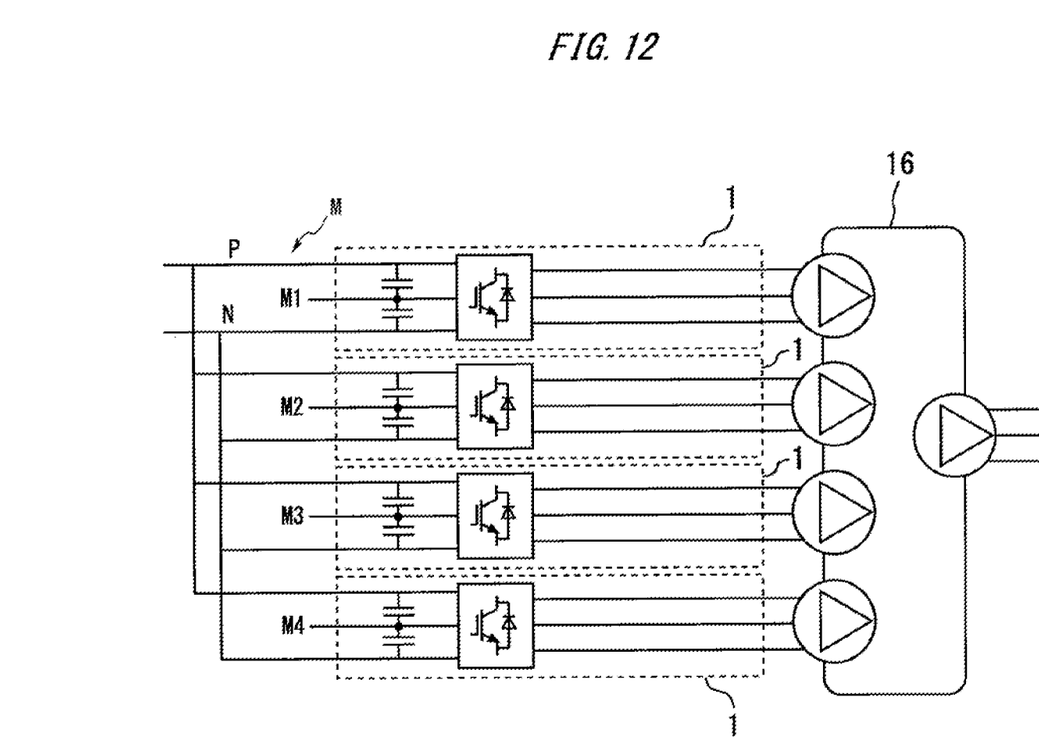
FIG. 12 is a configuration diagram of a major part of a multiplex power conversion system according to Embodiment 7.

FIG. 12 is a configuration diagram of a major part of a multiplex power conversion system according to Embodiment 7. Note that parts that are identical or correspond to parts in Embodiment 2 are provided with reference numerals that are the same as those of the parts in Embodiment 2. Descriptions of such parts will be omitted.

As illustrated in FIG. 12, the output side of each of a plurality of unit power converters 1 is connected to a multi-winding transformer 16.

According to Embodiment 7 described above, in the plurality of unit power converters 1, respective direct-current neutral points M (represented as M1, M2, M3, and M4) are not short-circuited. Therefore, as in Embodiment 1, a circulating current is reduced. As a result, in selection of an electric component, an amount of superimposition that should be taken into consideration in circulating current is reduced and ratings of the electric component is thus lowered, enabling reduction in cost of the multiplex power conversion system.

Also, even if a short-circuit failure occurs between a direct-current positive side P and a direct-current neutral point M in a certain unit power converter 1, no short-circuit current flows among the direct-current neutral points M of the respective unit power converters 1. Therefore, as in Embodiment 1, there is no need for fuses to be inserted for preventing a short-circuit failure of a unit power converter 1 from spreading to a failure of the other unit power converters where the respective direct-current neutral points M are connected. As a result, costs can be reduced by the amount of the fuses.

Although the multiplex power conversion system according to Embodiment 7 includes a voltage dividing circuit that is equivalent to the voltage dividing circuit in Embodiment 2 although the voltage dividing circuit is not illustrated.

According to Embodiment 7 described above, as in Embodiment 2, the number of voltage sensors can be reduced in comparison with Embodiment 1.

Embodiment 8

Figure 13:
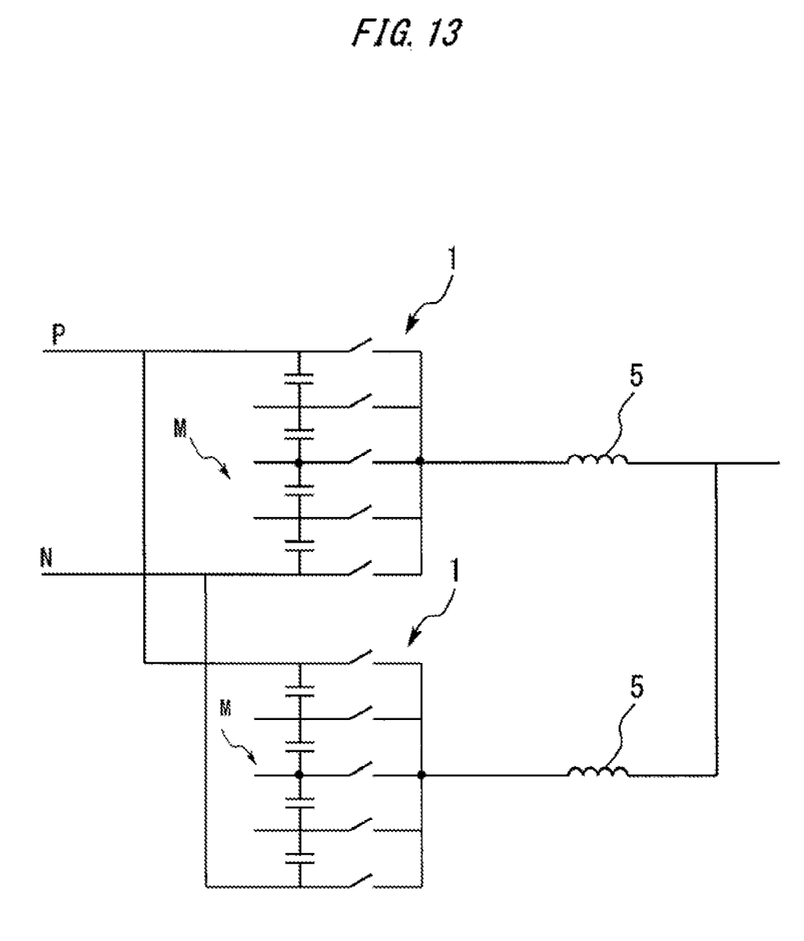
FIG. 13 is a configuration diagram of a major part of a multiplex power conversion system according to Embodiment 8.

FIG. 13 is a configuration diagram of a major part of a multiplex power conversion system according to Embodiment 8. Note that parts that are identical or correspond to parts in Embodiment 1 are provided with reference numerals that are the same as those of the parts in Embodiment 1. Descriptions of such parts will be omitted.

As illustrated in FIG. 13, each of unit power converters 1 in Embodiment 8 is a five-level power converter. The five-level power converter is a power converter including, for example, four direct-current capacitors connected in series, and an alternate-current terminal that selects and outputs any one of a total of five electrodes of the direct-current capacitors, the five electrodes including a highest potential electrode P and a lowest potential electrode N and three electrodes that are intermediate potentials between the highest potential and the lowest potential, the alternate-current terminal being provided for one phase or each of a plurality of phases. Although in FIG. 13, a function that outputs a potential of an electrode of a direct-current side to an alternate-current side is illustrated in a graphic symbol of a switch, in many cases, a combination of a self-excited semiconductor device and a diode is provided so as to have a function that is equivalent to that function. Also, FIG. 13 illustrates an example of a case where unit power converters 1 each include an alternate-current terminal for one phase.

In this case, in the plurality of unit power converter 1, each of a plurality of direct-current neutral points M is selected from the relevant plurality of capacitors other than those having a highest potential and a lowest potential. The direct-current neutral points M are not short-circuited.

According to Embodiment 8 described above, as in Embodiment 1, a failure can be prevented from spreading, with a simple configuration. Also, a failure of a unit power converter 1 can be detected.

Note that where it is necessary to detect all of potential differences of the plurality of direct-current neutral points in the plurality of unit power converters 1, it is possible to connect the relevant direct-current neutral points via resistances to detect a potential difference at each of a plurality of connection points.

Note that in the unit power converters 1 in Embodiments 1 to 8, each unit power converter 1 converts direct-current power into alternate-current power, converts alternate-current power into direct-current power or compensate reactive power. In any case, a failure can be prevented from spreading, with a simple configuration. Also, a failure of a unit power converter 1 can be detected.

Note that in each of the plurality of unit power converters 1, a plurality of switches may be provided at at least two of the direct-current positive side P, the direct-current negative side N and the direct-current neutral point M. In this case, the plurality of switches may be disconnected in a failed unit power converter 1 based on detection values from a plurality of positive-side voltage sensors 6. As a result, operation of the multiplex power conversion system can be maintained with non-failed unit power converters 1 left.

INDUSTRIAL APPLICABILITY

As above, a multiplex power conversion system according to the present invention can be used for a system that prevents a failure of a power converter from spreading, with a simple configuration.

REFERENCE SIGNS LIST 1 unit power converter, 2 switching element group, 3 positive-side capacitor, 4 negative-side capacitor, 5 reactor, 6 positive-side voltage sensor, 7 negative-side voltage sensor, 8 control device, 9a processor, 9b memory, 10 hardware component, 11 unit resistance, 12 potential detection point, 13 unit voltage sensor, 14 integrated resistance, 15 integrated voltage sensor, 16 multi-winding transformer

The invention claimed is:

1. A multiplex power conversion system, comprising:
a plurality of unit power converters, respective direct-current positive sides of the plurality of unit power converters being connected, respective direct-current negative sides of the plurality of unit power converters being connected, and respective direct-current neutral points of the plurality of unit power converters being not directly short-circuited with one another;
a plurality of unit resistances respectively connected to the direct-current neutral points of the plurality of unit power converters, respectively, the plurality of unit resistances being divided in a plurality of groups, a number of the groups being no less than two, each of the groups including a potential detection point at which respective one ends of unit resistances belonging to the group are connected, the one ends being not directly connected to the direct-current neutral points of the respective unit power converters; and
a voltage detection sensor configured to detect a voltage between the potential detection points included in the respective groups,
wherein the potential detection points are not directly connected with one another.

2. A multiplex power conversion system, comprising:
a plurality of unit power converters, respective direct-current positive sides of the plurality of unit power converters being connected, respective direct-current negative sides of the plurality of unit power converters being connected, and respective direct-current neutral points of the plurality of unit power converters being not directly short-circuited with one another;
a plurality of unit resistances, respective one ends of the plurality of unit resistances being connected to the respective direct-current neutral points of the plurality of unit power converters, the plurality of unit resistances being respectively connected in series to the direct-current neutral points of the plurality of unit power converters;
a potential detection point to which respective one ends of the plurality of unit resistances are connected, the one ends being not directly connected to the direct-current neutral points of the unit power converters;
a sensor configured to detect a voltage between the potential detection point and a direct-current positive side or a voltage between the potential detection point and a direct-current negative side; and
a plurality of voltage detection sensors configured to detect a voltage applied to unit resistances of the plurality of unit resistances, a number of the plurality of voltage detection sensors being smaller than a number of the plurality of unit power converters by one.

3. The multiplex power conversion system according to claim 1, comprising a control device configured to perform a protection operation based on the voltage detected by the voltage detection sensor.

4. The multiplex power conversion system according to claim 3, wherein the control device provides an off signal to gates of all of switching elements in a switching element group included in at least one of the unit power converters based on a value of the voltage detected by the voltage detection sensor.

5. The multiplex power conversion system according to claim 3, further comprising a switch provided on at least one of the direct-current side and the alternate-current side in each of the plurality of unit power converters,
 wherein the control device disconnects the switch for a failed unit power converter based on a value of the voltage detected by the voltage detection sensor.

* * * * *